United States Patent
Kamata et al.

(10) Patent No.: US 11,235,786 B2
(45) Date of Patent: Feb. 1, 2022

(54) VEHICLE ALLOCATION APPARATUS AND VEHICLE ALLOCATION METHOD

(71) Applicant: Toyota Jidosha Kabushiki Kaisha, Toyota (JP)

(72) Inventors: Nobuhide Kamata, Susono (JP); Yasuo Uehara, Gotemba (JP); Nozomu Hatta, Susono (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 16/749,264

(22) Filed: Jan. 22, 2020

(65) Prior Publication Data
US 2020/0239032 A1   Jul. 30, 2020

(30) Foreign Application Priority Data

Jan. 24, 2019   (JP) .............................. JP2019-010445

(51) Int. Cl.
| | | |
|---|---|---|
| *B60W 60/00* | (2020.01) | |
| *G05D 1/02* | (2020.01) | |
| *G06Q 50/30* | (2012.01) | |

(52) U.S. Cl.
CPC ..... *B60W 60/00253* (2020.02); *G05D 1/0212* (2013.01); *G05D 1/0276* (2013.01); *B60W 2556/50* (2020.02); *G06Q 50/30* (2013.01)

(58) Field of Classification Search
CPC ........ B60W 60/00253; B60W 2556/50; G05D 1/0276; G05D 1/0212; G06Q 50/30; G06Q 10/02; G08G 1/202
See application file for complete search history.

(56) References Cited

U.S. PATENT DOCUMENTS

| | | | |
|---|---|---|---|
| 2018/0315022 A1 | 11/2018 | Yamamoto et al. | |
| 2019/0103028 A1 | 4/2019 | Kobayashi et al. | |
| 2020/0064143 A1* | 2/2020 | Engle | G01C 21/3415 |
| 2020/0143409 A1* | 5/2020 | Hollinger | G06Q 30/0233 |

FOREIGN PATENT DOCUMENTS

| | | |
|---|---|---|
| JP | 2017-182137 A | 10/2017 |
| JP | 2018-185693 A | 11/2018 |

* cited by examiner

*Primary Examiner* — Rodney A Butler
(74) *Attorney, Agent, or Firm* — Dinsmore & Shohl LLP

(57) ABSTRACT

The vehicle allocation apparatus includes a vehicle assignment unit that assigns a self-driving vehicle to a vehicle dispatch request including ride location information indicating a ride location of a prospective passenger wishing for dispatch of the self-driving vehicle, a travel instruction unit that instructs, through a communication unit, the assigned self-driving vehicle to move via the ride location, and a ride confirmation unit that acquires, from the assigned self-driving vehicle, ride information indicating whether the prospective passenger has ridden in the assigned self-driving vehicle after arrival of the assigned self-driving vehicle at the ride location. Before a predetermined vehicle re-allocation grace time passes after receiving the ride information indicating that the prospective passenger has not ridden in the assigned self-driving vehicle, the vehicle assignment unit assigns a self-driving vehicle other than the assigned self-driving vehicle to a vehicle dispatch request from other than the prospective passenger.

6 Claims, 10 Drawing Sheets

VEHICLE ALLOCATION APPARATUS AND VEHICLE ALLOCATION METHOD

CROSS-REFERENCE TO RELATED APPLICATION

This application claims priority to Japanese Patent Application No. 2019-010445 filed on Jan. 24, 2019, and is incorporated herein by reference in its entirety.

FIELD

The present disclosure relates to a vehicle allocation apparatus and a vehicle allocation method.

BACKGROUND

A mobile service providing system is known that drives a self-driving vehicle to a destination designated by a vehicle allocation apparatus and provides a mobile service to a passenger. The vehicle allocation apparatus designates the destination based on information about a ride request, an exit request and so on of the passenger. A travel control apparatus mounted on the self driving vehicle controls operations such as the power, steering or braking of the own vehicle to travel the own vehicle to the destination. The travel control apparatus controls the travel of the self-driving vehicle based on vehicle-relevant information such as position information outputted from a positioning apparatus mounted on the own vehicle or image information acquired by an imaging apparatus.

A prospective passenger wishing to receive the mobile service requests a dispatch of a self-driving vehicle to a ride location. The vehicle allocation apparatus designates the ride location as a destination of the self-driving vehicle, and the prospective passenger rides in the self-driving vehicle when the self-driving vehicle has arrived at the ride location.

Patent Literature 1 describes a ride share management apparatus configured to send information about available facilities to a prospective passenger when it is assumed that vehicle's estimated arrival time at a ride location will be after a desired ride time.

CITATION LIST

Patent Literature

[PTL 1] Japanese Patent Application Laid-open No. 2018-185693.

SUMMARY

Technical Problem

In some cases, the prospective passenger cannot ride the dispatched self-driving vehicle. For example, when the prospective passenger has arrived at the ride location after the expected ride time, if the self-driving vehicle having arrived at the ride location at the expected ride time cannot stop there to wait for the prospective passenger, the self-driving vehicle has to leave the ride location without waiting for the prospective passenger to ride in.

It is undesirable to allocate, in response to a vehicle re-dispatch request from the prospective passenger who could not ride in the self-driving vehicle, another self-driving vehicle which is distant from the prospective passenger from the viewpoint of resource saving, because the travel distance of the re-dispatched self-driving vehicle becomes long. In addition, since the time necessary for the self-driving vehicle to arrive at a ride location designated in the vehicle re-dispatch request becomes long, the prospective passenger may feel dissatisfied.

The rideshare management apparatus described in the above PTL1 takes into account enhancing the convenience when a self-driving vehicle arrives at a ride location with a delay. However, it does not take into account enhancing the convenience when a prospective passenger could not ride in a self-driving vehicle.

An object of the present disclosure is to provide a vehicle allocation apparatus and a vehicle allocation method that enable assigning a self-driving vehicle appropriately in response to a vehicle re-dispatch request from a prospective passenger who could not ride in a dispatched self-driving vehicle at a designated ride location.

Solution to Problem

A vehicle allocation apparatus according to the present disclosure includes:

a vehicle assignment unit that assigns, upon receiving a vehicle dispatch request including ride location information indicating a ride location of a prospective passenger wishing for dispatch of the self-driving vehicle, a self-driving vehicle to the vehicle dispatch request;

a travel instruction unit that instructs, through a communication unit configured to be communicable with the self-driving vehicle, the assigned self-driving vehicle to move via the ride location; and a ride confirmation unit that acquires, from the assigned self-driving vehicle and through the communication unit, ride information indicating whether the prospective passenger has ridden in the assigned self-driving vehicle after arrival of the assigned self-driving vehicle at the ride location, wherein before a predetermined vehicle re-allocation grace time passes after receiving the ride information indicating that the prospective passenger has not ridden in the assigned self-driving vehicle, the vehicle assignment unit assigns a self-driving vehicle other than the assigned self-driving vehicle to a vehicle dispatch request from a prospective passenger other than the prospective passenger.

In the vehicle allocation apparatus according to the present disclosure, the vehicle re-allocation grace time may be a time necessary for the assigned self-driving vehicle to run from a ride location to a point at a predetermined distance from the ride location along the running route of the self-driving vehicle after the self-driving vehicle arrived at the ride location.

In the vehicle allocation apparatus according to the present disclosure, upon receiving a vehicle re-dispatch request from the prospective passenger before the vehicle re-allocation grace time passes after acquiring ride information indicating that the prospective passenger has not ridden the assigned self-driving vehicle the vehicle assignment unit re-assigns the assigned self-driving vehicle to the vehicle re-dispatch request.

In some embodiments, the vehicle allocation apparatus according to the present disclosure is provided with a change notification unit which sends, through the communication unit, a route change notification to terminals carried by existing passengers already riding in the assigned self-driving vehicle for notifying that the running route will be changed so as to travel via the ride location again, when receiving a vehicle re-dispatch request.

In some embodiments, in the vehicle allocation apparatus according to the present disclosure, the route change notification includes a route change acceptability inquiry for inquiring existing passengers whether they accept to change the running route so as to travel via the ride location again.

In some embodiments, upon receiving a reply accepting to change the running route from a majority of the existing passengers, the vehicle assignment unit of the vehicle allocation apparatus according to the present disclosure assigns the assigned self-driving vehicle to the vehicle re-dispatch request.

In some embodiments, the change notification unit of the vehicle allocation apparatus according to the present disclosure notifies, at the time of making the route change acceptability inquiry, that a point will be given to the existing passengers accepting to change the running route.

A vehicle allocation method for allocating a self-driving vehicle by using a vehicle allocation apparatus according to the present disclosure includes:

upon receiving a vehicle dispatch request including ride location information indicating a ride location of a prospective passenger wishing for dispatch of the self-driving vehicle, the vehicle allocation apparatus assigning a self-driving vehicle to the vehicle dispatch request;

the vehicle allocation apparatus instructing, through a communication unit configured to be communicable with the self-driving vehicle, the assigned self-driving vehicle to move via the ride location;

the vehicle allocation apparatus acquiring, from the assigned self-driving vehicle and through the communication unit, ride information indicating whether the prospective passenger has ridden in the assigned self-driving vehicle before a predetermined ride waiting time passes after arrival of the assigned self-driving vehicle at the ride location, and before a predetermined vehicle re-allocation grace time passes after receiving the ride information indicating that the prospective passenger has not ridden in the assigned self-driving vehicle, the vehicle allocation apparatus assigning a self-driving vehicle other than the assigned self-driving vehicle to a vehicle dispatch request from a prospective passenger other than the prospective passenger.

According to the vehicle allocation apparatus of the present disclosure, it is possible to assign a self-driving vehicle acceptability in response to a vehicle re-dispatch request from a prospective passenger who could not ride in a dispatched self-driving vehicle at a designated ride location.

DETAILED DESCRIPTION

A vehicle allocation apparatus and a vehicle allocation method are described in detail below. However, it should be noted that the present disclosure is not limited to the drawings or below described embodiments.

The vehicle allocation apparatus according to the present disclosure assigns a self-driving vehicle upon receiving a vehicle dispatch request including ride location information indicating a ride location of a prospective passenger wishing a self-driving vehicle to be dispatched. The vehicle allocation apparatus instructs the assigned self-driving vehicle to move via the ride location through a communication unit thereof configured to be communicable with the self-driving vehicle. After arrival of the assigned self-driving vehicle at the ride location, the vehicle allocation apparatus acquires, from the assigned self-driving vehicle and through the communication unit, ride information indicating whether the prospective passenger has ridden in the assigned self-driving vehicle. Before a predetermined vehicle re-allocation grace time passes after receiving ride information indicating that the prospective passenger has not ridden in the assigned self-driving vehicle, the vehicle allocation apparatus assigns, to a vehicle dispatch request from a prospective passenger other than the prospective passenger who has not ridden in the assigned self-driving vehicle, a self-driving vehicle other than the self-driving vehicle having been assigned. This makes it possible for the vehicle allocation apparatus to appropriately assign a self-driving vehicle to a vehicle re-dispatch request from the prospective passenger who could not ride in the assigned self-driving vehicle at the designated ride location.

Figure 1:
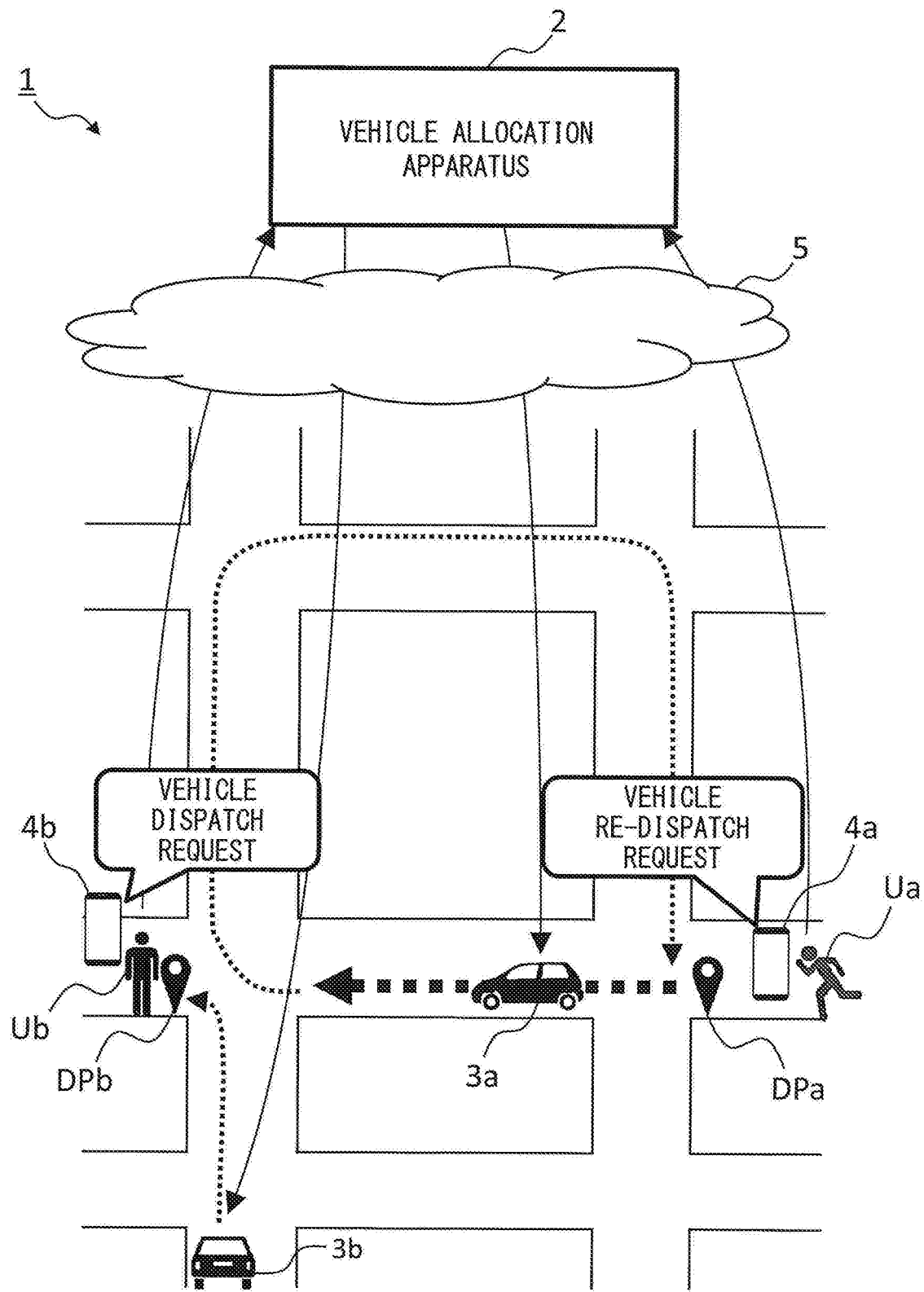
FIG. 1 is a diagram illustrating outline of operation of a mobile service providing system.

FIG. 1 is diagram illustrating outline of operation of a mobile service providing system 1.

A mobile service providing system 1 includes a vehicle allocation apparatus 2, a plurality of self-driving vehicles 3a and 3b (may be collectively referred to as self-driving vehicle 3), and user terminals 4a and 4b (may be collectively referred to as user terminal 4). The vehicle allocation apparatus 2, self-driving vehicle 3, and user terminal 4 are connected with one another through a network 5.

The network 5 is the internet enabling communication by TCP/IP (Transport Control Protocol/Internet Protocol), for example. Any equipment performing communication by using the network 5 is connected thereto by wire or by radio. The connection by radio may be a LAN (Local Area Network) connection such as IEEE (The Institute of Electrical and Electronics Engineers) 802.11 ac. The connection by radio may be a wireless WAN (Wide Area Network) connection such as 4G (4th Generation).

Upon receiving a vehicle dispatch request designating a ride location DPa from a user terminal 4a carried by a user Ua through the network 5, the vehicle allocation apparatus 2 assigns a self-driving vehicle 3a to the vehicle dispatch request. Then, the vehicle allocation apparatus 2 instructs, through the network 5, the self-driving vehicle 3a to move via the ride location DPa.

After arriving at the ride location DPa, if the user does not ride in the self-driving vehicle 3a, the self-driving vehicle 3a sends a message indicating that the user Ua has not ridden therein to the vehicle allocation apparatus 2 through the network 5, and starts to move to the next destination.

In the case of receiving a vehicle dispatch request from a user other than the user Ua before a re-ride grace period passes after receiving ride information from the self-driving vehicle 3a indicating that the prospective passenger Ua has not ridden in the self-driving vehicle 3a, the vehicle allocation apparatus 2 assigns a self-driving vehicle 3 other than the self-driving vehicle 3a. In the example illustrated in FIG. 1, vehicle allocation apparatus 2 assigns a self-driving vehicle 3b different from the self-driving vehicle 3a to a vehicle dispatch request designating a ride location DP2 received from a user terminal 4b carried by a user Ub different from the user Ua.

When receiving a vehicle re-dispatch request from the user terminal 4a carried by the prospective passenger Ua who could not ride in the self-driving vehicle 3a at the designated ride location DPa within the re-ride grace period, the vehicle allocation apparatus 2 can appropriately assign a self-driving vehicle 3 to this vehicle re-dispatch request.

Figure 2:
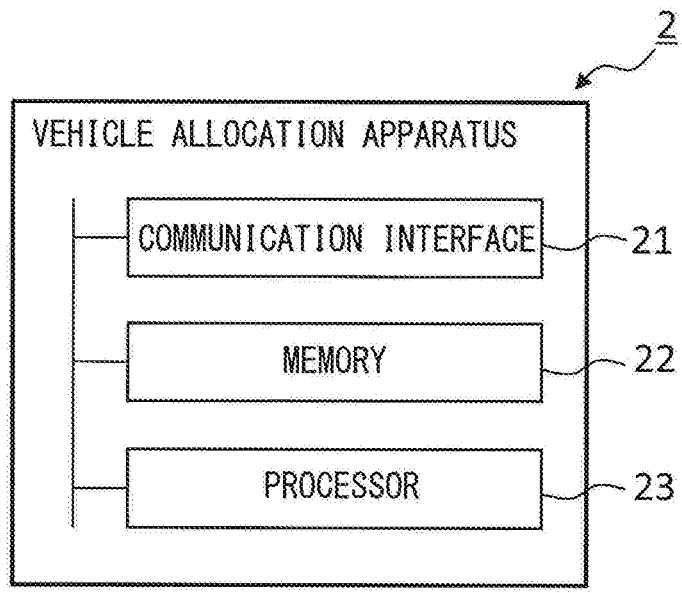
FIG. 2 is a hardware schematic diagram of a vehicle allocation apparatus.

FIG. 2 is a hardware schematic diagram of the vehicle allocation apparatus.

The vehicle allocation apparatus 2 connects to a self-driving vehicle 3 through the network 5, and acquires position information indicating the travel position of the self-driving vehicle 3 and user information indicating a ride state of a user riding in the self-driving vehicle 3. Further, the vehicle allocation apparatus 2 connects to a user terminal 4 through the network 5, and receives a vehicle dispatch request for dispatching a vehicle to a ride location. Then, the vehicle allocation apparatus 2 instructs, through the network 5, the self-driving vehicle 3 to move via the ride location. For this purpose, the vehicle allocation apparatus 2 includes a communication interface 21, a memory 22 and a processor 23.

The communication interface 21 is a communication interface circuit for connecting the vehicle allocation apparatus 2 to the network 5. The communication interface 21 provides the processor 23 with data received from the self-driving vehicle 3 and the user terminal 4 through the network 5. Further, the communication interface 21 transmits data provided from the processor 23 to the self-driving vehicle 3 and the user terminal 4 through the network 5.

The memory 22 includes at least one of a semiconductor memory, a magnetic disk unit and an optical disk unit. The memory 22 stores a driver program, an operating system program, an application program, data and so on used for processings by the processor 23. For example, the memory 22 stores a communication device driver program for controlling the communication interface 21 as a driver program. These various programs may be installed in the memory 22 from a computer-readable portable recording medium using a known setup program or the like. The computer-readable portable recording medium is a CD-ROM (Compact Disc Read-Only Memory) or a DVD-ROM (DVD Read-Only Memory), for example. The memory 22 stores various data necessary for self-driving vehicle allocation, such as passenger information or current location of the self-driving vehicle 3.

The processor 23 includes at least one processor and its peripheral circuit. The processor 23 integrally controls the whole operation of the vehicle allocation apparatus 2, and is, for example, a CPU (Central Processing Unit). The processor 23 controls the operation of the communication interface 21 etc., so that various pieces of processing of the vehicle allocation apparatus 2 are performed by appropriate means based on the programs stored in the memory 22. The processor 23 performs processing based on the programs (the operating system program, driver program, application program etc.) stored in the memory 22. The processor 23 can perform a plurality of the programs (application programs and so on) in parallel.

Figure 3:
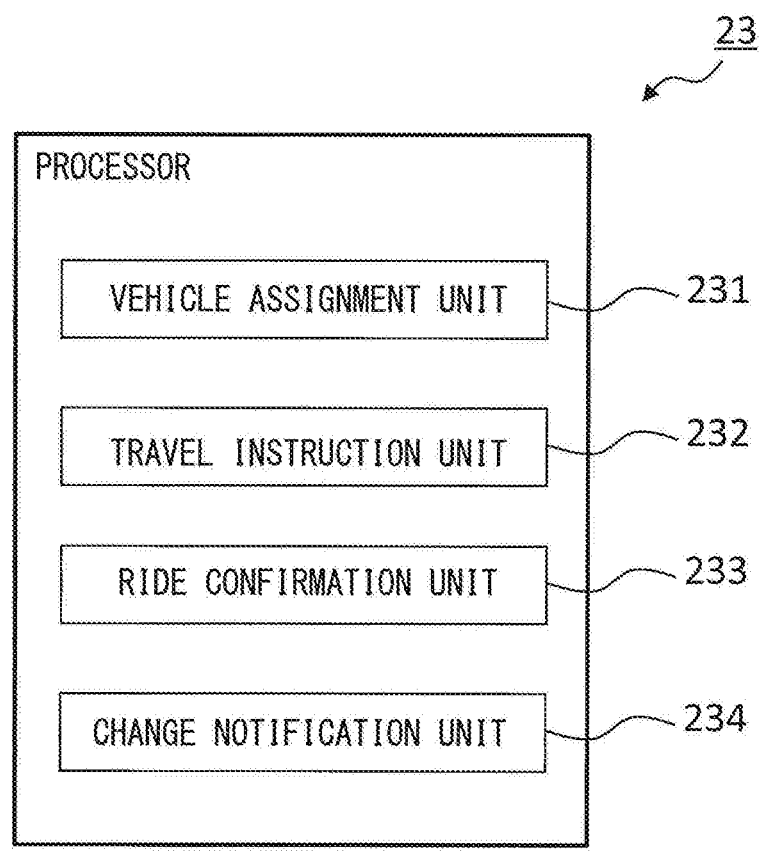
FIG. 3 is a functional block diagram of a processor included in the vehicle allocation apparatus.

FIG. 3 is a functional block diagram of the processor included in the vehicle allocation apparatus 2.

The processor 23 includes, as functional blocks, a vehicle assignment unit 231, a travel instruction unit 232, a ride confirmation unit 233 and a change notification unit 234. These units of the processor 23 are functional modules implemented by programs executed on the processor 23. Alternatively, these units of the processor 23 may be implemented in the vehicle allocation apparatus 2 as discrete integrated circuits, microprocessors, or firmware.

The vehicle assignment unit 231 assigns a self-driving vehicle 3 to a vehicle dispatch request received. For example, the vehicle assignment unit 231 receives a vehicle dispatch request from the user terminal 4 through the communication interface 21. The user terminal 4 is a terminal carried by a prospective passenger wishing for dispatch of a self-driving vehicle 3. The vehicle dispatch request includes ride location information indicating a ride location of the prospective passenger. The vehicle assignment unit 231 determines a self-driving vehicle 3 to be moved via the ride location designated in the vehicle dispatch request.

In the case of receiving a vehicle re-dispatch request from the prospective passenger who did not ride in the self-driving vehicle 3 at the ride location and wishes for vehicle dispatch, the vehicle assignment unit 231 assigns a self-driving vehicle 3 to the vehicle re-dispatch request. When the vehicle re-dispatch request is received before the vehicle re-allocation grace time passes after receiving ride information indicating that the prospective passenger has not ridden in, the vehicle assignment unit 231 assigns again the self-driving vehicle 3 having been assigned.

The travel instruction unit 232 instructs the assigned self-driving vehicle 3 to move via the ride location. For example, the travel instruction unit 232 acquires information about the current location of the self-driving vehicle 3 from this self-driving vehicle 3 through the communication interface 21. Then, the travel instruction unit 232 prepares a running route from the current location with a via-point designated as the ride location, and sends it to the self-driving vehicle 3 through the communication interface 21. The travel instruction unit 232 prepares the running route in accordance with a prescribed route search program using the Dijkstra's algorithm or the like.

The ride confirmation unit 233 acquires ride information from the assigned self-driving vehicle 3 through the communication interface 21. The ride information is information indicating whether a prospective passenger has ridden in an assigned self-driving vehicle 3 after the assigned self-driving vehicle 3 moved in accordance with the running route information and arrived at the ride location.

The change notification unit 234 sends a route change notification through the communication interface 21. The route change notification is information notifying the terminals carried by existing passengers already riding in the self-driving vehicle 3 that the running route will be changed so as to travel via the ride location again, in the case where the running route is changed in accordance with a vehicle re-dispatch request.

Figure 4:
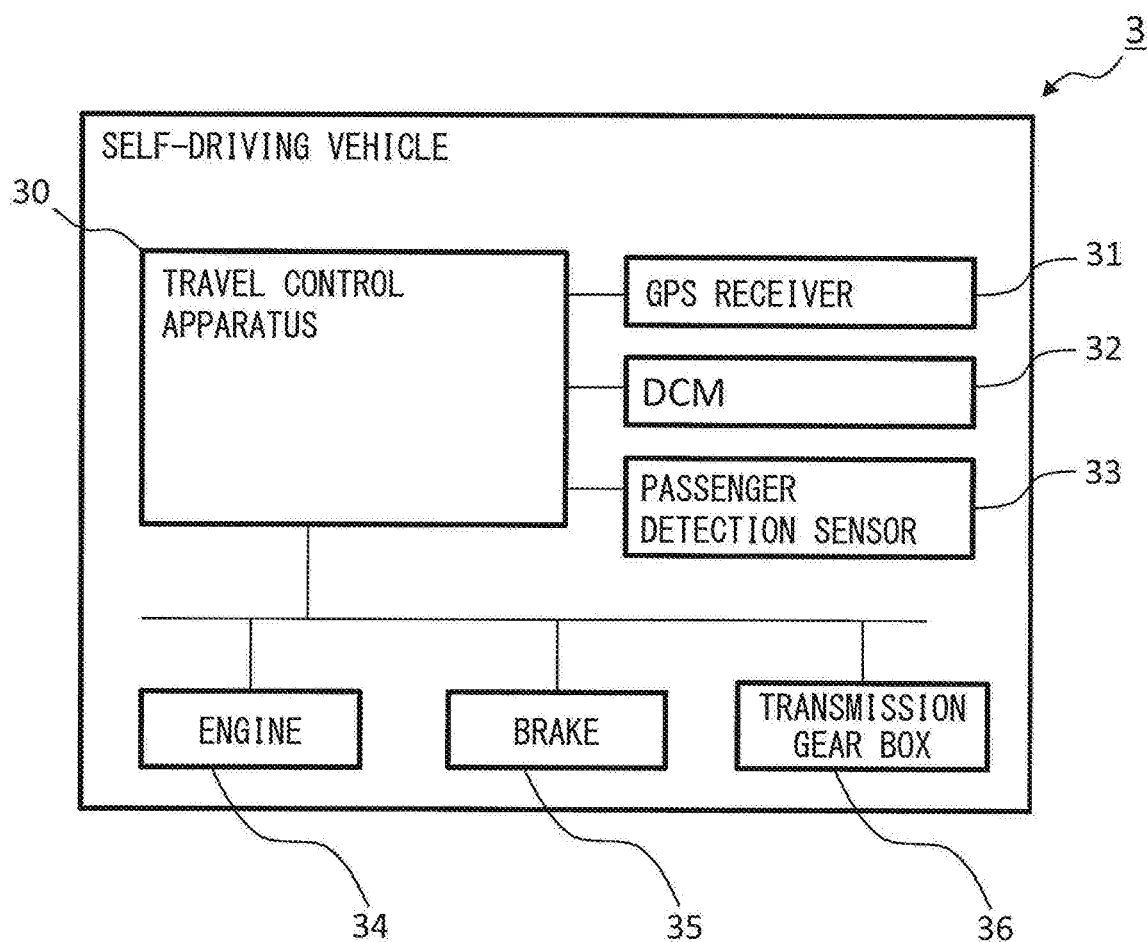
FIG. 4 is a hardware schematic diagram of a self-driving vehicle.

FIG. 4 is a hardware schematic diagram of the self-driving vehicle.

The self-driving vehicle 3 includes a travel control apparatus 30, a GPS (Global Positioning System) receiver 31, a data communication module (DCM: Data Communication Module) 32 and a passenger detection sensor 33. Further, the self-driving vehicle 3 includes an engine 34, a brake 35 and a transmission gearbox 36.

The travel control apparatus 30 sends location information of the self-driving vehicle 3 acquired by the GPS receiver 31 to the vehicle allocation apparatus 2 through the data communication module 32. Further, the travel control apparatus 30 receives a running route with a via-point designated as the ride location through the data communication module 32.

The travel control apparatus 30 is connected with the engine 34, brake 35 and transmission gearbox 36 of the self-driving vehicle 3 through a communication interface to thereby electronically control the engine 34, brake 35 and transmission gearbox 36 of the self-driving vehicle 3. By controlling the engine 34 and so on of the self-driving vehicle 3, the travel control apparatus 30 makes the self-driving vehicle 3 travel towards a destination. The structure of the travel control apparatus 30 is described in detail later.

The GPS receiver 31 determines the current location based on signals received from GPS satellites. The GPS receiver 31 is connected to the travel control apparatus 30, so that the travel control apparatus 30 can detect the current location of the self-driving vehicle 3. The signals received by the GPS receiver 31 are not limited to the ones from GPS satellites. They may be signals from satellites of any satellite positioning system, such as GLONASS, Galileo or Compass. The GPS receiver 31 may determine the current location based on any technique other than such satellite positioning systems.

The data communication module 32 includes a communication interface for connection with the network 5. The data communication module 32 performs communication with an external apparatus such as the vehicle allocation apparatus 2. The data communication module 32 is connected to the travel control apparatus 30, so that the travel control apparatus 30 can exchange data with equipment connected to the network 5 such as the vehicle allocation apparatus 2 through the data communication module 32.

The passenger detection sensor 33 includes weight sensors respectively provided in the seats of the self-driving vehicle 3, for example. In this case, the travel control apparatus 30 detects whether a user rides in the self-driving vehicle 3 as a passenger based on the weight detected by the passenger detection sensor 33. The passenger detection sensor 33 may be a camera for taking an image of the inside the cabin of the self-driving vehicle 3. In this case, the travel control apparatus 30 supplies the image outputted from the passenger detection sensor 33 to a discriminator learned in advance to detect a person in an image, to thereby detect whether a passenger rides in the self-driving vehicle 3.

Figure 5:
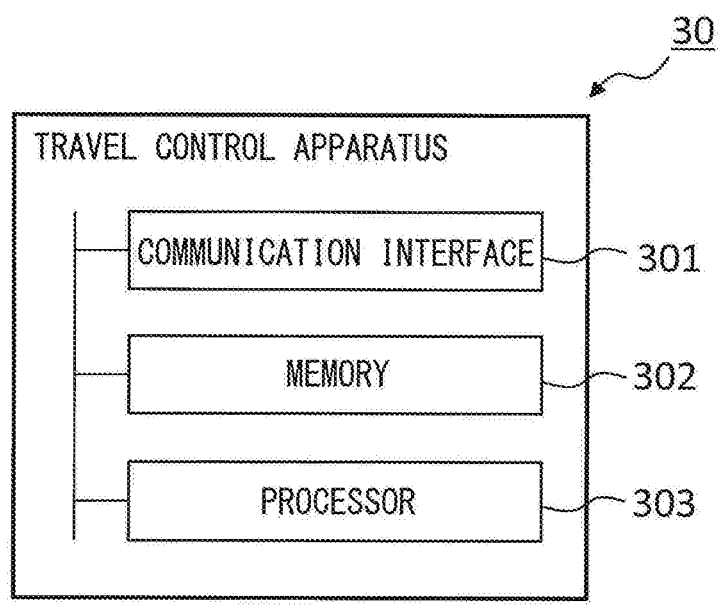
FIG. 5 is a hardware schematic diagram of a travel control apparatus.

FIG. 5 is a hardware schematic diagram of the travel control apparatus.

The travel control apparatus 30 includes a communication interface 301, a memory 302 and a processor 303. The travel control apparatus 30 is mounted on the self-driving vehicle 3 as an ECU (Electronic Control Unit).

The communication interface 301 is a communication interface circuit for connecting the travel control apparatus 30 to other equipment mounted on the self-driving vehicle 3 such as the GPS receiver 31, data communication module 32 and passenger detection sensor 33. The communication interface 301 supplies the processor 303 with data received from other equipment. Further, the communication interface 301 sends data supplied from the processor 303 to other equipment.

The memory 302 stores data used for processing performed by the processor 303, such as identifiers for identifying the self-driving vehicle 3.

The processor 303 performs arithmetic operations based on signals supplied from the communication interface 301, and output signals to the communication interface 301. The processor 303 performs arithmetic operations by executing a predetermined program.

Figure 6:
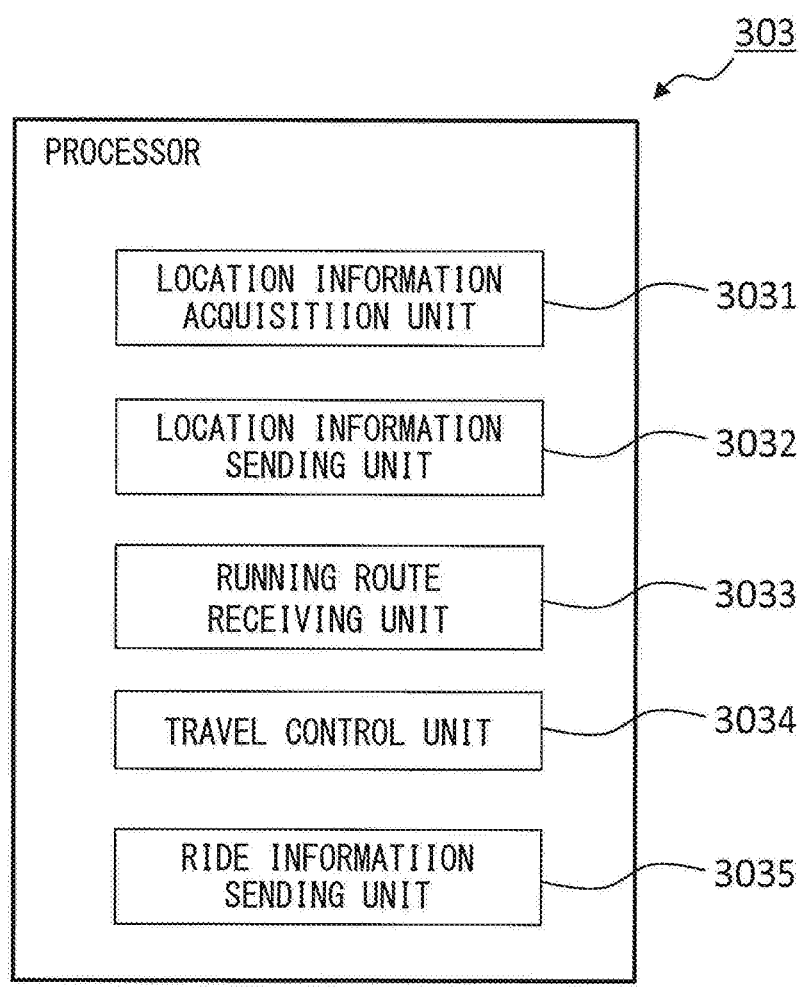
FIG. 6 is a functional block diagram of a processor included in the travel control apparatus.

FIG. 6 is a functional block diagram of the processor included in the travel control apparatus.

The processor 303 of the travel control apparatus 30 includes, as functional blocks, a location information acquisition unit 3031, a location information sending unit 3032, a running route receiving unit 3033, a travel control unit 3034 and a ride information sending unit 3035. These units of the processor 303 are functional modules implemented by a program executed on the processor 303. Alternatively, these units of the processor 303 may be implemented in the travel control apparatus 30 as dedicated circuits.

The location information acquisition unit 3031 acquires information on the current location of the self-driving vehicle 3 from the GPS receiver 31 through the communication interface 301 at predetermined time intervals (every minute, for example). Alternatively, the location information acquisition unit 3031 may acquire the information on the current location in response to a location information request received from the travel instruction unit 232 of the vehicle allocation apparatus 2.

The location information sending unit 3032 sends the information on the current location acquired by the location information acquisition unit 3031 to the vehicle allocation apparatus 2 through the communication interface 301 by using the data communication module 32 together with the identifier stored in the memory 302.

The running route receiving unit 3033 receives a running route with a via-point designated as the ride location from the vehicle allocation apparatus 2 through the data communication module 32. The running route is sent from the vehicle allocation apparatus 2 when a via-point is newly set or changed.

The travel control unit 3034 makes the self-driving vehicle 3 run following the running route so as to travel via the via-point. The travel control unit 3034 controls the operation of the engine 34 and so on based on the running route received by the running route receiving unit 3033, to thereby make the self-driving vehicle 3 travel to a destination.

The ride information sending unit 3035 sends ride information to the vehicle allocation apparatus 2 through the data communication module 32. The ride information is information indicating whether a prospective passenger has ridden in an assigned self-driving vehicle 3. For example, the ride information sending unit 3035 sends the ride information indicating that a prospective passenger has ridden in, when a passenger is newly detected by the passenger detection sensor 33 while the current location of the self-driving vehicle 3 is within a predetermined range from the ride location which has been designated as a via-point. The ride information sending unit 3035 may send the ride information indicating that a prospective passenger has ridden in, after verifying individual identification information such as bio-information on fingerprint, face and the like, or user terminal identification information for a prospective passenger and the newly detected passenger, and confirming coincidence therebetween.

Figure 7:
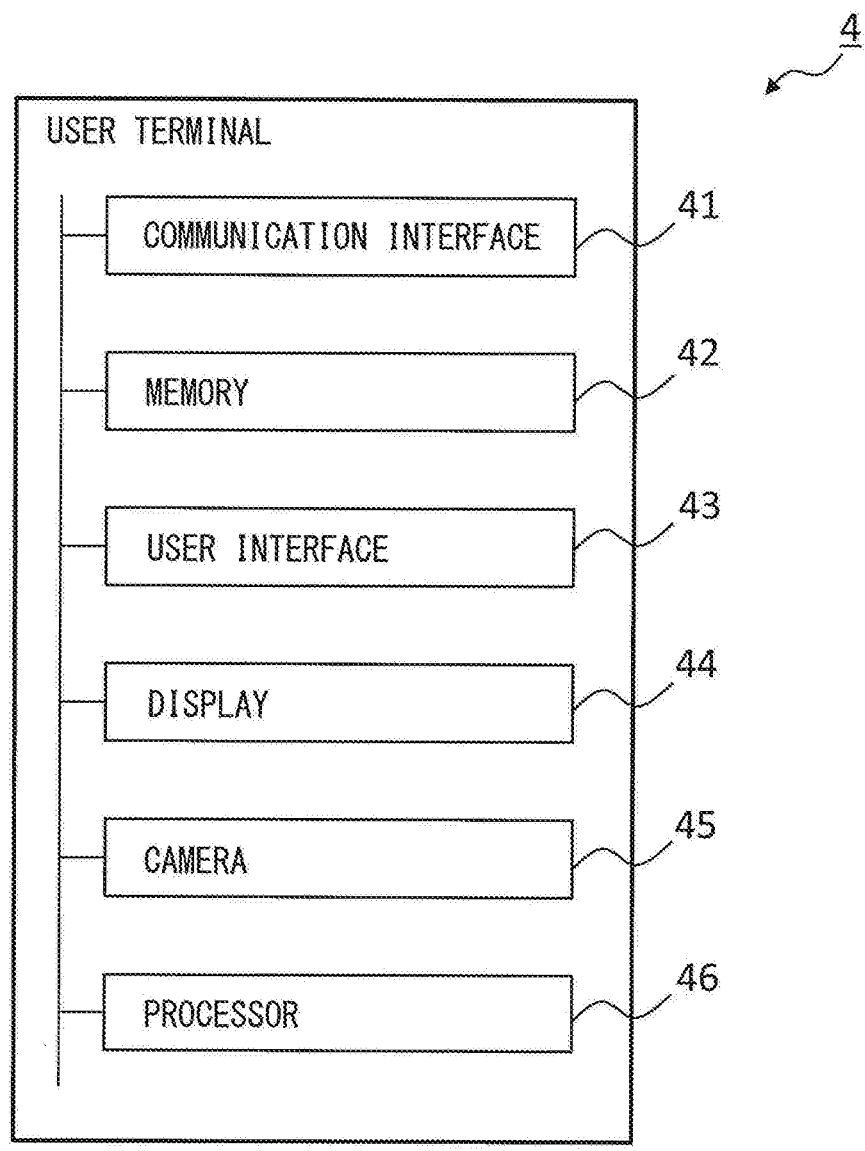
FIG. 7 is a hardware schematic diagram of a user terminal.

FIG. 7 is a hardware schematic diagram of the user terminal.

The user terminal 4 is a portable terminal carried by a user riding in or planning to ride in the self-driving vehicle 3. The user terminal 4 connects to the vehicle allocation apparatus 2 through the network 5 to send a vehicle dispatch request in accordance with the operation of the user. Further, the user terminal 4 connects to the vehicle allocation apparatus 2 through the network 5 to receive a route change notification. For this purpose, the user terminal 4 includes a communication interface 41, a memory 42, a user interface 43, a display 44, a camera 45 and a processor 46.

The communication interface 41 is a communication interface circuit for connecting the user terminal 4 to the network 5. The communication interface 41 provides the processor 46 with data received from the vehicle allocation apparatus 2 and the self-driving vehicle 3 through the network 5. Further, the communication interface 41 sends data supplied from the processor 46 to the vehicle allocation apparatus 2 and the self-driving vehicle 3 through the network 5.

The memory 42 includes at least one of a semiconductor memory, a magnetic disk unit and an optical disk unit. The memory 42 stores a driver program, an operating system program, an application program, data and so on used for processing by the processor 46. For example, the memory 42 stores a communication device driver program for controlling the communication interface 41 as a driver program. These various programs may be installed in the memory 42 from a computer-readable portable recording medium using a known setup program or the like.

The computer-readable portable recording medium is a CD-ROM (Compact Disc Read-Only Memory) or a DVD-ROM (DVD Read-Only Memory), for example. The memory 42 stores various data necessary for allocation of the self-driving vehicle 3, such as user terminal connection information.

The user interface 43, which is a device for accepting input and output to and from the user terminal 4, includes a touch panel or key buttons for accepting user operation, a microphone, a speaker and so on. A user can input an instruction such as characters, numeric characters or symbols into specific coordinates on the screen by using the user interface 43. In response to the user operation, the user interface 43 generates a signal corresponding to the operation. This generated signal is supplied to the processor 46 as an instruction of a user. Further, voice or the like is outputted in accordance with a signal generated by the processor 46.

The display 44, which is a device for displaying an image, may be a liquid crystal display or an organic electroluminescence display. The display 44 displays an image in accordance with image data required by the processor 46.

The camera 45 includes an imaging optical system and an imaging sensor, and is configured to take an image in which the peripheral area of the user terminal 4 is shown.

The processor 46 includes at least one processor and its peripheral circuit. The processor 46, which integrally controls the whole operation of the user terminal 4, and is, for example, a CPU (Central Processing Unit). The processor 46 controls the operation of the communication interface 41 etc. so that various pieces of processing of the user terminal 4 are performed by appropriate means based on the programs stored in the memory 42. The processor 46 performs processing based on the programs (the operating system program, driver program, application program etc.) stored in the memory 42. The processor 46 can perform a plurality of the programs (application programs or the like) in parallel.

Figure 8:
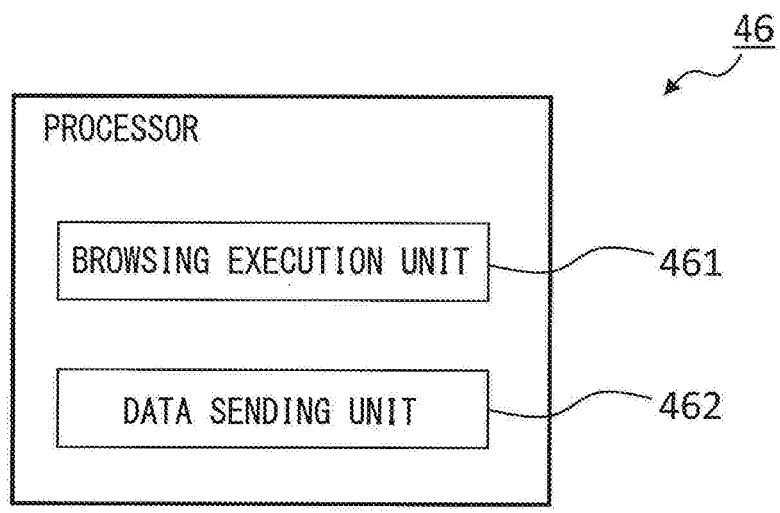
FIG. 8 is a functional block diagram of a processor included in the user terminal.

FIG. 8 is a functional block diagram of the processor included in the user terminal.

The processor 46 of the user terminal 4 includes a browsing execution unit 461 and a data sending unit 462. These units of the processor 46 are functional modules implemented by programs executed on the processor 46. Alternatively, these units of the processor 46 may be mounted on the user terminal 4 as dedicated circuits.

The browsing execution unit 461 performs various processing based on data received through the communication interface 41, such as displaying an image on the display 44 or outputting data to the user interface 43.

The data sending unit 462 sends, through the communication interface 41, data such as an input accepted by the user interface 43 or an image generated by the camera 45.

Figure 9:
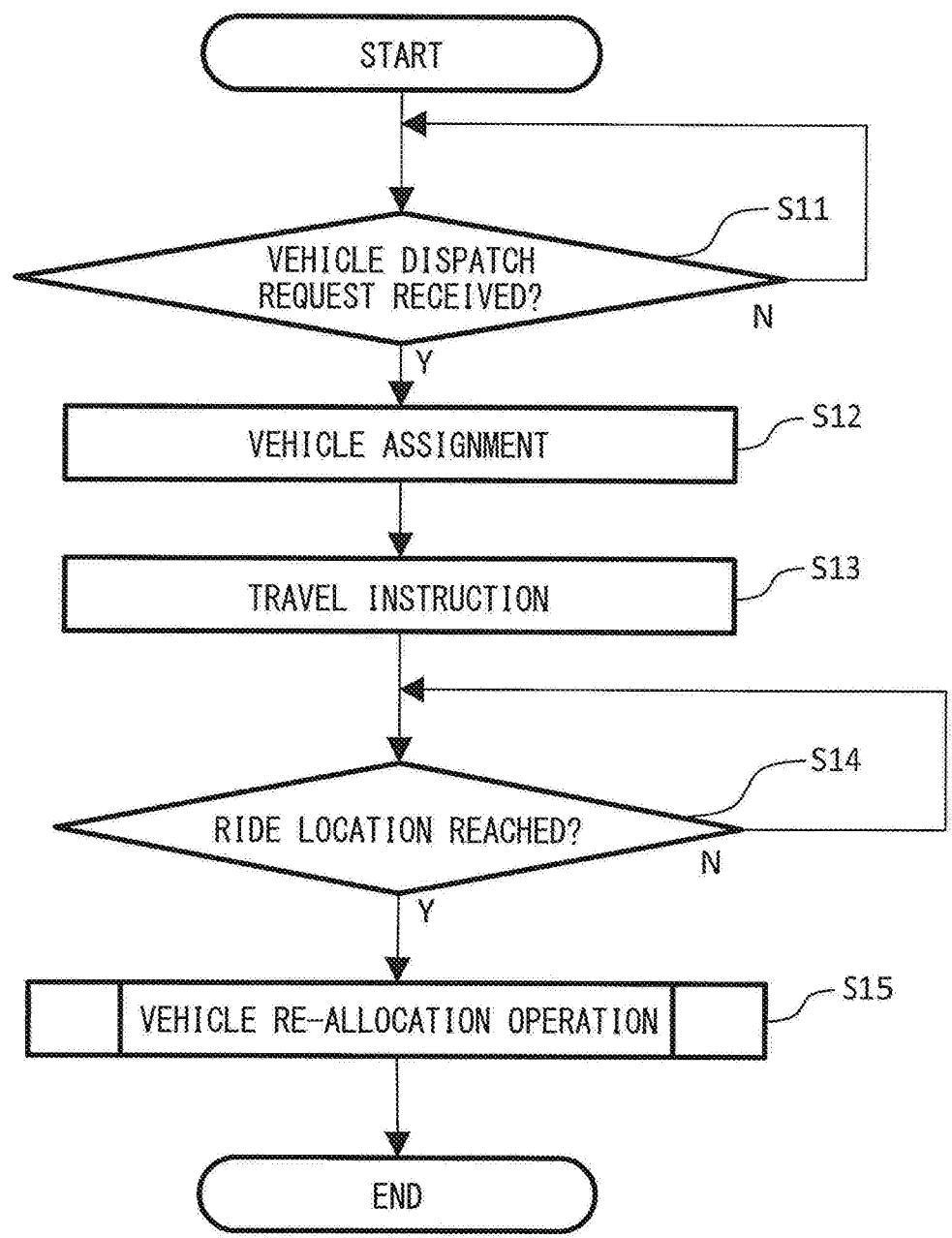
FIG. 9 is an operation flowchart of the vehicle allocation apparatus.

FIG. 9 is an operation flowchart of the vehicle allocation apparatus. The vehicle allocation apparatus performs the operation illustrated in FIG. 9 at predetermined intervals (every 10 minutes, for example).

The vehicle assignment unit 231 determines whether a vehicle dispatch request has been received from a user terminal 4 through the communication interface 21 (step S11). The vehicle dispatch request includes riding location information indicating the riding location of a prospective passenger carrying the user terminal 4.

When determining that a vehicle dispatch request is not received (step S11: N), the vehicle assignment unit 231 repeats the process of step S11. The vehicle assignment unit 231 may repeat the process of step S11 after a predetermined waiting time (30 seconds, for example) has elapsed. The vehicle allocation apparatus 2 may terminate the operation when the determination that a vehicle dispatch request is not received has been made by the vehicle assignment unit 231 consecutively a predetermined number of times (20 times, for example).

When it is determined that a vehicle dispatch request has been received (step S11: Y), the vehicle assignment unit 231 assigns a self-driving vehicle 3 to the vehicle dispatch request (step S12). For example, the vehicle assignment unit 231 assigns, to the vehicle dispatch request, a self-driving vehicle 3 which requires the shortest time to arrive at a ride location designated in the vehicle dispatch request. Alternatively, the vehicle assignment unit 231 may assign a self-driving vehicle 3 which is the closest to the ride location designated in the vehicle dispatch request.

Then, the travel instruction unit 232 instructs the assigned self-driving vehicle 3 to move via the ride location (step S13).

Then, the travel instruction unit 232 determines whether the current location of the self-driving vehicle 3 has reached the ride location (step S14). When it is determined that the current location of the self-driving vehicle 3 has not reached the ride location yet (step S14: N), the travel instruction unit 232 repeats the process of step S14. The travel instruction unit 232 may repeat the process of step S14 after a predetermined waiting time (30 seconds, for example) has elapsed.

When it is determined that the current location of the self-driving vehicle 3 has reached the ride location (step S14: Y), the processor 23 of the vehicle allocation apparatus 2 performs a vehicle re-allocation operation (step S15), and terminates the series of processes. The detail of the vehicle re-allocation operation is described in the following.

Figure 10:
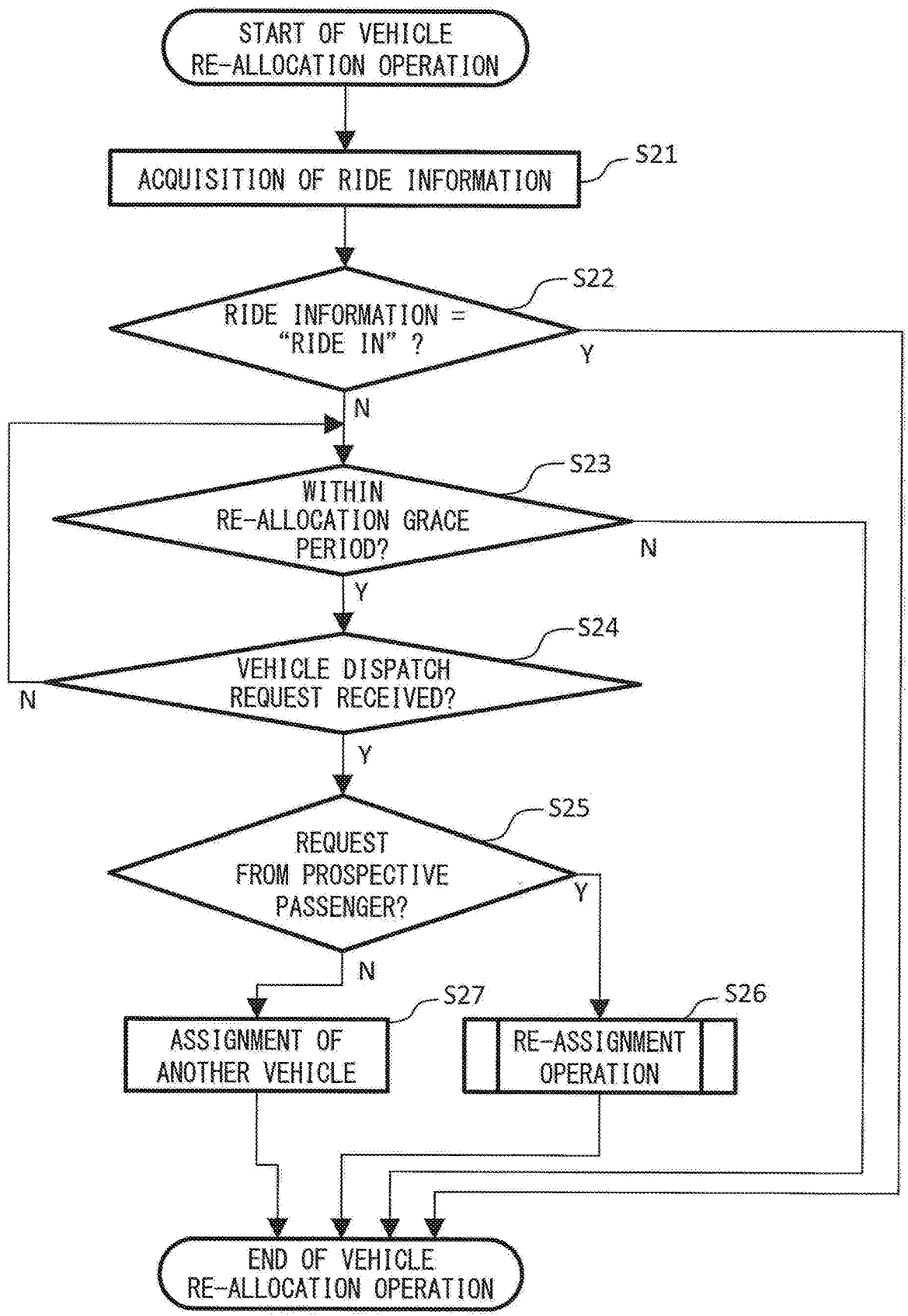
FIG. 10 is a flowchart of a vehicle re-allocation operation of the vehicle allocation apparatus.

FIG. 10 is a flowchart of the vehicle re-allocation operation of the vehicle allocation apparatus 2.

When the vehicle re-allocation operation (step S15) is started, the ride confirmation unit 233 acquires ride information from the assigned self-driving vehicle 3 (step S21). The ride information, which is information indicating whether a prospective passenger has ridden in the assigned self-driving vehicle 3, is sent from the ride information sending unit 3035 of the self-driving vehicle 3 through the network 5.

Then, the ride confirmation unit 233 determines whether the acquired ride information indicates that the prospective passenger has ridden in the assigned self-driving vehicle 3 (step S22). When the acquired ride information indicates that the prospective passenger has ridden in the self-driving vehicle 3 (step S22: Y), the processor 23 of the vehicle allocation apparatus 2 terminates the vehicle re-allocation operation.

When the acquired ride information indicates that the prospective passenger has not ridden in the self-driving vehicle 3 (step S22: N), the ride confirmation unit 233 determines whether the current time is within a vehicle re-allocation grace time (step S23).

The vehicle re-allocation grace time is a period within which a re-allocation of the self-driving vehicle 3 is performed in response to a vehicle re-dispatch request from the prospective passenger who could not ride in the self-driving vehicle 3. The vehicle re-allocation grace time starts from the time when the assigned self-driving vehicle 3 has arrived at the ride location. The vehicle re-allocation grace time may be a time stored in advance in the memory 22 (10 minutes, for example). Alternatively, the vehicle re-allocation grace time may be a time necessary for the self-driving vehicle 3 to run from the ride location to a point away from the ride location by a predetermined distance along the running route. In this case, the predetermined distance (500 m, for example) is stored in advance in the memory 22.

When it is determined that the current time is not within the vehicle re-allocation grace time (step S23: N), the processor 23 of the vehicle allocation apparatus 2 terminates the vehicle re-allocation operation.

When it is determined that the current time is within the vehicle re-allocation grace time (step S23: Y), the vehicle assignment unit 231 determines whether a vehicle dispatch request has been received from the user terminal 4 (step S24).

When it is determined that a vehicle dispatch request is not received from the user terminal 4 (step S24: N), the operation returns to step S23 where the ride confirmation unit 233 determines whether the current time is within the vehicle re-allocation grace period.

When it is determined that a vehicle dispatch request has been received from the user terminal 4 (step S24: Y), the vehicle assignment unit 231 determines whether the received vehicle dispatch request is from the prospective passenger (step S25).

When it is determined that the received vehicle dispatch request is from the prospective passenger (step S25: Y), the processor 23 of the vehicle allocation apparatus 2 performs a re-assignment operation (step S26), and terminates the vehicle re-allocation operation.

When it is determined that the received vehicle dispatch request is not from the prospective passenger (step S25: N), vehicle assignment unit 231 assigns a self-driving vehicle 3 other than the self-driving vehicle in which the prospective passenger could not ride (step S27), and then the vehicle re-allocation operation is terminated.

Figure 11:
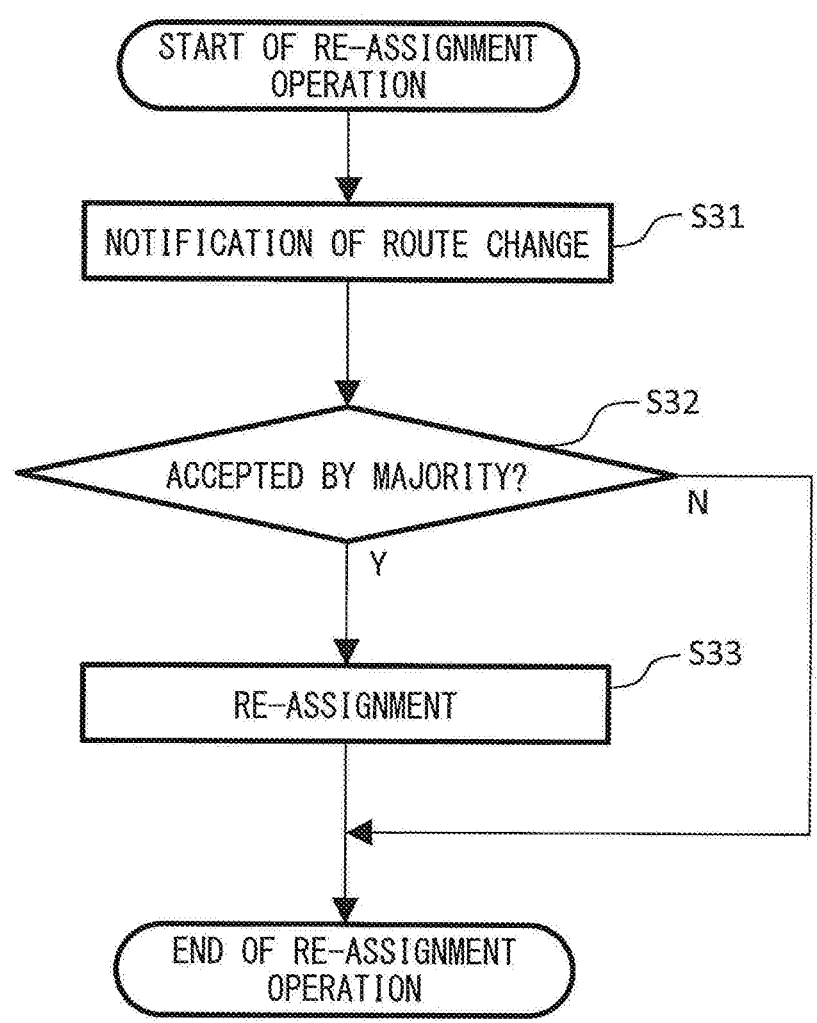
FIG. 11 is a flowchart of a re-assignment operation of the vehicle allocation apparatus.

FIG. 11 is a flowchart of the re-assignment operation of the vehicle allocation apparatus 2.

When the re-assignment operation (step S26) is started, the change notification unit 234 sends a route change notification (step S31) through the communication interface 21 to the terminals carried by existing passengers already riding in the self-driving vehicle 3 having been assigned to the vehicle dispatch request. The route change notification is information for notifying the existing passengers that the running route will be changed so as to travel via the ride location again.

The route change notification includes a route change acceptability inquiry for inquiring the existing passengers whether the existing passengers accept to change the running route so as to travel via the ride location again. In addition, the route change notification may include a notification notifying that a point will be given to the existing passengers accepting to change the running route. The point may be applied, for example, to the usage fee of the mobile service providing system 1.

The change notification unit 234 determines whether a reply to the route change acceptability inquiry accepting to change the running route has been received from a majority of the existing passengers (step S32).

When it is determined that a reply of acceptance has been received from a majority of the existing passengers (step S32: Y), the vehicle assignment unit 231 assigns the self-driving vehicle having been assigned to the vehicle dispatch request to a vehicle dispatch request from the prospective passenger again (step S33), and then the re-assignment operation is terminated. By assigning the self-driving vehicle having been assigned to the vehicle dispatch request to a vehicle dispatch request from the prospective passenger again, the running route of the self-driving vehicle is changed so as to travel via the ride location again.

When it is determined that a reply of acceptance is not received from a majority of the existing passengers (step S32: N), the processor 23 of the vehicle allocation apparatus 2 terminates the re-assignment operation.

It should be understood that various changes, replacements or modifications can be made to the present disclosure without departing from the spirit and scope thereof.

REFERENCE SIGNS LIST

1 mobile service providing system
2 vehicle allocation apparatus
231 vehicle assignment unit
232 travel instruction unit
233 ride confirmation unit
234 change notification unit
3 self-driving vehicle
4 user terminal

What is claimed is:

1. A vehicle allocation apparatus comprising:
   a communication unit configured to be communicable with a self-driving vehicle; and,
   processing circuitry, wherein the processing circuitry is configured to:
   upon receiving a vehicle dispatch request including ride location information indicating a ride location of a prospective passenger wishing for dispatch of the self-driving vehicle, assign the self-driving vehicle to the vehicle dispatch request;
   instruct the assigned self-driving vehicle to move to the ride location via the communication unit;
   acquire, from the assigned self-driving vehicle via the communication unit, ride information indicating whether the prospective passenger has ridden in the assigned self-driving vehicle after arrival of the assigned self-driving vehicle at the ride location;
   after receiving the ride information indicating that the prospective passenger has not ridden in the assigned self-driving vehicle and before a predetermined vehicle re-allocation grace time passes, assign a self-driving vehicle other than the assigned self-driving vehicle to a second vehicle dispatch request from a second prospective passenger other than the prospective passenger;

upon receiving a vehicle re-dispatch request from the prospective passenger before the vehicle re-allocation grace time passes after acquiring the ride information indicating that the prospective passenger has not ridden in the assigned self-driving vehicle, re-assign the assigned self-driving vehicle to the vehicle re-dispatch request; and upon receiving the vehicle re-dispatch request, notify, via the communication unit, a terminal carried by an existing passenger already riding in the assigned self-driving vehicle that a running route is changed so as to travel to the ride location again.

2. The vehicle allocation apparatus according to claim 1, wherein the vehicle re-allocation grace time is a time necessary for the assigned self-driving vehicle to run from the ride location to a point away from the ride location by a predetermined distance along a running route of the assigned self-driving vehicle after arrival of the assigned self-driving vehicle at the ride location.

3. The vehicle allocation apparatus according to claim 1, wherein the notification of route change includes a route change acceptability inquiry for inquiring existing passengers whether the existing passengers accept to change the running route so as to travel to the ride location again.

4. The vehicle allocation apparatus according to claim 3, wherein the processing circuitry is further configured to, upon receiving a reply accepting to change the running route from a majority of the existing passengers, assign the assigned self-driving vehicle to the vehicle re-dispatch request.

5. The vehicle allocation apparatus according to claim 3, wherein the processing circuitry is further configured to, upon notifying the route change acceptability inquiry, notify that a point is given to the existing passengers accepting to change the running route.

6. A vehicle allocation method for allocating a self-driving vehicle by using a vehicle allocation apparatus, comprising:
upon receiving a vehicle dispatch request including ride location information indicating a ride location of a prospective passenger wishing for dispatch of the self-driving vehicle, the vehicle allocation apparatus assigning a self-driving vehicle to the vehicle dispatch request;

the vehicle allocation apparatus instructing, via a communication unit configured to be communicable with the self-driving vehicle, the assigned self-driving vehicle to move to the ride location;

before a predetermined ride waiting time passes after arrival of the assigned self-driving vehicle at the ride location, the vehicle allocation apparatus acquiring, from the assigned self-driving vehicle and via the communication unit, ride information indicating whether the prospective passenger has ridden in the assigned self-driving vehicle;

before a predetermined vehicle re-allocation grace time passes after receiving the ride information indicating that the prospective passenger has not ridden in the assigned self-driving vehicle, the vehicle allocation apparatus assigning a self-driving vehicle other than the assigned self-driving vehicle to a second vehicle dispatch request from a second prospective passenger other than the prospective passenger;

upon receiving a vehicle re-dispatch request from the prospective passenger before a vehicle re-allocation grace time passes after acquiring the ride information indicating that the prospective passenger has not ridden in the assigned self-driving vehicle, the vehicle allocation apparatus re-assigning the assigned self-driving vehicle to the vehicle re-dispatch request;

upon receiving the vehicle re-dispatch request, the vehicle allocation apparatus notifying, through the communication unit, a terminal carried by an existing passenger already riding in the assigned self-driving vehicle that a running route is changed so as to travel to the ride location again.

* * * * *